United States Patent
Gady et al.

(10) Patent No.: US 7,736,595 B2
(45) Date of Patent: Jun. 15, 2010

(54) DOSING AGENT INJECTION CONTROL FOR SELECTIVE CATALYTIC REDUCTION CATALYSTS

(75) Inventors: Kevin Andrew Gady, Ypsilanti, MI (US); Anupam Gangopadhyay, Chennai (IN)

(73) Assignee: GM Global Technology Operations, Inc. (US)

( * ) Notice: Subject to any disclaimer, the term of this patent is extended or adjusted under 35 U.S.C. 154(b) by 0 days.

(21) Appl. No.: 12/417,945

(22) Filed: Apr. 3, 2009

(65) Prior Publication Data

US 2010/0028230 A1    Feb. 4, 2010

Related U.S. Application Data

(60) Provisional application No. 61/084,826, filed on Jul. 30, 2008.

(51) Int. Cl.
*B01D 53/56* (2006.01)
*B01D 53/94* (2006.01)
*F01N 3/18* (2006.01)
*G05D 21/00* (2006.01)

(52) U.S. Cl. .......... 422/105; 422/108; 422/111; 423/213.2; 423/239.1; 423/DIG. 5; 60/276; 60/299; 700/271; 700/274

(58) Field of Classification Search .......... 423/213.2, 423/239.1, DIG. 5; 422/105, 108, 111; 60/276, 60/299; 700/271, 274
See application file for complete search history.

(56) References Cited

U.S. PATENT DOCUMENTS 6,981,368 B2    1/2006   van Nieuwstadt et al.
2009/0272104 A1*  11/2009   Garimella et al. .......... 60/287

* cited by examiner

*Primary Examiner*—Timothy C Vanoy

(57) ABSTRACT

A dosing control system comprises a selective catalytic reduction (SCR) analysis module and a dosing management module. The SCR analysis module estimates ammonia (NH3) stored by an SCR catalyst, maximum NH3 storage capacity of the SCR catalyst, NH3 slip downstream of the SCR catalyst, NH3 oxidation, and NH3 conversion through reaction with nitrogen oxides (NOx). The NH3 stored is estimated based an amount of dosing agent injected, the NH3 slip, the NH3 oxidation, and the NH3 conversion. The dosing management module controls dosing agent injection into an exhaust system upstream of the SCR catalyst based on the NH3 stored by the SCR catalyst and the maximum NH3 storage capacity.

18 Claims, 4 Drawing Sheets

DOSING AGENT INJECTION CONTROL FOR SELECTIVE CATALYTIC REDUCTION CATALYSTS

CROSS-REFERENCE TO RELATED APPLICATIONS

This application claims the benefit of U.S. Provisional Application No. 61/084,826, filed on Jul. 30, 2008.

This application is related to U.S. patent application Ser. Nos. 12/417,962 filed on Apr. 3, 2009 and 12/418,031 filed on Apr. 3, 2009. The disclosures of the above applications are incorporated herein by reference in their entirety.

FIELD

The present disclosure relates to engine systems and more particularly to exhaust treatment systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine system 100 is presented. Air is drawn into an engine 102 through an intake manifold 104. A throttle valve 106 controls airflow into the engine 102. An electronic throttle controller (ETC) 108 controls the throttle valve 106 and, therefore, the airflow into the engine 102. The air mixes with fuel from one or more fuel injectors 110 to form an air/fuel mixture. The air/fuel mixture is combusted within one or more cylinders of the engine 102, such as cylinder 112. Combustion of the air/fuel mixture generates torque.

Exhaust resulting from the combustion of the air/fuel mixture is expelled from the cylinders to an exhaust system 113. The exhaust may include particulate matter (PM) and gas. The exhaust gas includes nitrogen oxides (NOx), such as nitrogen oxide (NO) and nitrogen dioxide ($NO_2$). The exhaust system 113 includes a treatment system 114 that reduces the respective amounts of NOx and PM in the exhaust.

The treatment system 114 includes a diesel oxidation catalyst (DOC) 116, a dosing agent injector 118, and a selective catalytic reduction (SCR) catalyst 120. The exhaust flows from the engine 102 to the DOC 116. The DOC 116 removes hydrocarbons and/or carbon oxides from the exhaust. The dosing agent injector 118 injects a dosing agent into the exhaust stream, upstream of the SCR catalyst 120. $NH_3$ provided by the dosing agent is absorbed by the SCR catalyst 120. $NH_3$ reacts with NOx in the exhaust passing the SCR catalyst 120.

An engine control module (ECM) 130 controls the torque output of the engine 102. The ECM 130 includes a dosing module 140 that controls the mass flow rate of dosing agent injected by the dosing agent injector 118. In this manner, the dosing module 140 controls $NH_3$ supplied to the SCR catalyst 120. Specifically, the dosing module 140 controls $NH_3$ supplied to the SCR catalyst 120 to control the amount of oxygen stored by the SCR catalyst 120.

The dosing module 140 controls the mass flowrate of dosing agent injected based upon signals from various sensors. For example only, the sensors include: one or more NOx sensors, such as NOx sensors 142 and 144; one or more temperature sensors, such as temperature sensors 146, 148, and 150; and/or one or more oxygen sensors, such as oxygen sensor 152.

The dosing module 140 may control $NH_3$ supplied to the SCR catalyst 120 further based on signals from other sensors 154. For example only, the other sensors 154 may include a manifold absolute pressure (MAP) sensor, a mass air flow (MAF) sensor, a throttle position sensor (TPS), an intake air temperature (IAT) sensor, and/or any other suitable sensor.

The amount of $NH_3$ stored by the SCR catalyst 120 is referred to as current storage (mols). The percentage of NOx that is removed from the exhaust is referred to as the conversion efficiency or the NOx conversion rate. The NOx conversion rate is directly related to the current storage of the SCR catalyst 120. For example, the NOx conversion rate increases as the current storage of the SCR catalyst 120 increases. The dosing module 140 controls $NH_3$ supplied to maximize the NOx conversion rate.

SUMMARY

A dosing control system comprises a selective catalytic reduction (SCR) analysis module and a dosing management module. The SCR analysis module estimates ammonia (NH3) stored by an SCR catalyst, maximum NH3 storage capacity of the SCR catalyst, NH3 slip downstream of the SCR catalyst, NH3 oxidation, and NH3 conversion through reaction with nitrogen oxides (NOx). The NH3 stored is estimated based an amount of dosing agent injected, the NH3 slip, the NH3 oxidation, and the NH3 conversion. The dosing management module controls dosing agent injection into an exhaust system upstream of the SCR catalyst based on the NH3 stored by the SCR catalyst and the maximum NH3 storage capacity.

In other features, the dosing control system further comprises an error module. The error module determines a difference between NOx measured by a NOx sensor downstream of the SCR catalyst and an estimated NOx measurement for the NOx sensor. The error module selectively adjusts at least one of the maximum NH3 storage capacity and the NH3 stored based on the difference.

In still other features, the SCR analysis module estimates the estimated NOx measurement.

In further features, the dosing control system further comprises an adjustment module. The adjustment module outputs an adjusted estimate of the estimated NOx measurement based on the estimated NOx measurement and the NH3 slip. The error module determines the difference between the NOx measured by the NOx sensor and the adjusted estimate.

In still further features, the adjustment module delays the output of the adjusted estimate for a delay period for the NOx sensor.

In other features, the error module selectively increases the NH3 stored by the SCR catalyst when the difference is greater than a first predetermined amount while the NH3 stored is less than the maximum NH3 storage capacity and the NH3 slip is less than a second predetermined amount.

In still other features, the SCR analysis module estimates NH3 desorption and adjusts the NH3 slip based on the NH3 desorption.

In further features, the dosing management module determines an NH3 setpoint based on the maximum NH3 storage capacity and the NH3 stored and controls the dosing agent injection based on the NH3 setpoint.

In still further features, the SCR analysis module estimates the NH3 stored further based on NOx measured upstream of the SCR catalyst and nitrogen dioxide (NO2) in the NOx measured upstream of the SCR catalyst.

A dosing control method comprises: estimating a maximum ammonia (NH3) storage capacity of a selective catalytic reduction (SCR) catalyst; estimating NH3 slip downstream of the SCR catalyst; estimating NH3 oxidation; estimating NH3 conversion through reaction with nitrogen oxides (NOx); estimating NH3 stored by the SCR catalyst based an amount of dosing agent injected, the NH3 slip, the NH3 oxidation, and the NH3 conversion; and controlling dosing agent injection into an exhaust system upstream of the SCR catalyst based on the NH3 stored by the SCR catalyst and the maximum NH3 storage capacity.

In other features, the dosing control method further comprises determining a difference between NOx measured by a NOx sensor downstream of the SCR catalyst and an estimated NOx measurement for the NOx sensor and selectively adjusting at least one of the maximum NH3 storage capacity and the NH3 stored based on the difference.

In still other features, the dosing control method further comprises estimating the estimated NOx measurement.

In further features, the dosing control method further comprises outputting an adjusted estimate of the estimated NOx measurement based on the estimated NOx measurement and the NH3 slip. The determining the difference comprises determining the difference between the NOx measured by the NOx sensor and the adjusted estimate.

In still further features, the dosing control method further comprises delaying the outputting of the adjusted estimate for a delay period for the NOx sensor.

In other features, the selectively adjusting comprises selectively increasing the NH3 stored by the SCR catalyst when the difference is greater than a first predetermined amount while the NH3 stored is less than the maximum NH3 storage capacity and the NH3 slip is less than a second predetermined amount.

In still other features, the dosing control method further comprises estimating NH3 desorption and adjusting the NH3 slip based on the NH3 desorption.

In further features, the dosing control method further comprises determining an NH3 setpoint based on the maximum NH3 storage capacity and the NH3 stored and controlling the dosing agent injection based on the NH3 setpoint.

In still further features, the estimating the NH3 stored comprises estimating the NH3 stored further based on NOx measured upstream of the SCR catalyst and nitrogen dioxide (NO2) in the NOx measured upstream of the SCR catalyst.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
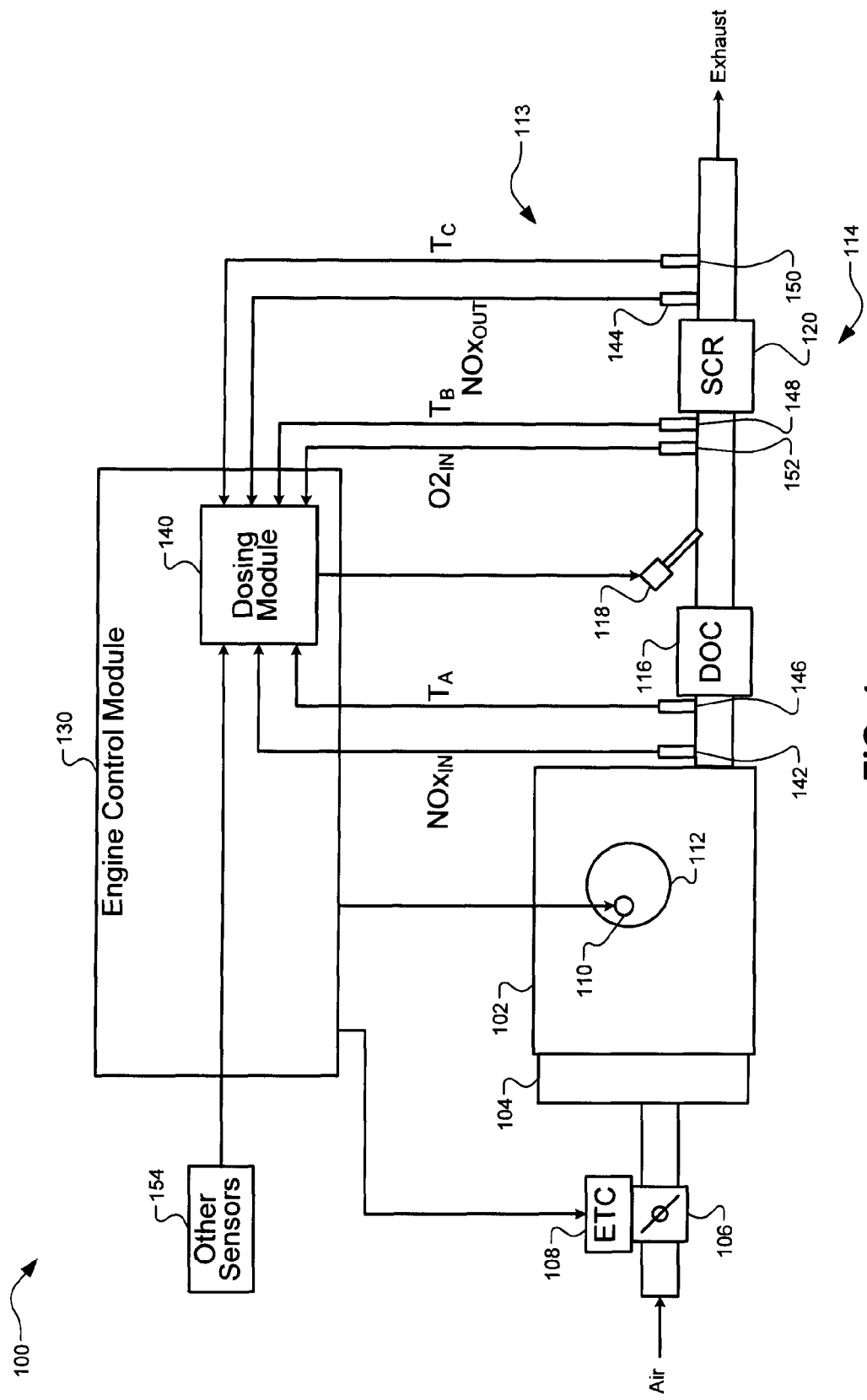
FIG. 1 is a functional block diagram of an engine system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A dosing control system controls injection of a dosing agent (e.g., urea) into an exhaust system upstream of a selective catalytic reduction (SCR) catalyst. The dosing agent reacts with nitrogen oxides (NOx) in the exhaust and reduces the amount of NOx downstream of the SCR catalyst.

The dosing control system of the present disclosure estimates an amount of ammonia ($NH_3$) stored by the SCR catalyst (i.e., current storage) and a maximum amount of $NH_3$ that the SCR catalyst is currently capable of storing (i.e., maximum storage capacity). The dosing control system of the present disclosure also estimates $NH_3$ conversion via reaction with NOx (i.e., $NH_3$ conversion), $NH_3$ oxidation, and an amount of $NH_3$ downstream of the SCR catalyst (i.e., $NH_3$ slip).

The dosing control system estimates the current storage based the amount of dosing agent injected, the $NH_3$ slip, the $NH_3$ oxidation, and the $NH_3$ conversion. The dosing control system controls injection of dosing agent upstream of the SCR catalyst based on the current storage and the maximum storage capacity.

Figure 2:
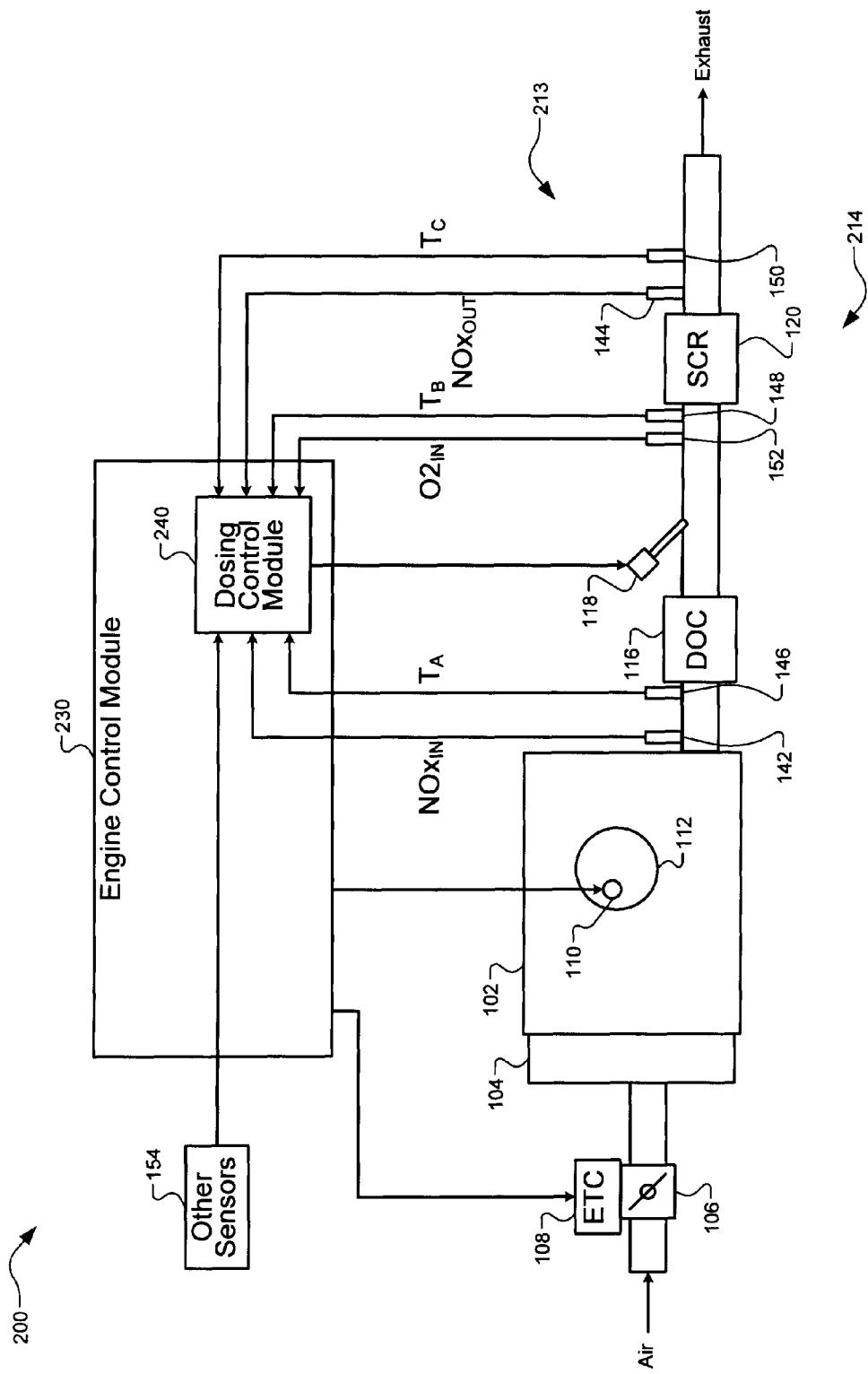
FIG. 2 is a functional block diagram of an exemplary engine system according to the principles of the present disclosure.

Referring now to FIG. 2, a functional block diagram of an exemplary engine system 200 is presented. The engine 102 may be, for example, a gasoline-type internal combustion engine, a diesel-type internal combustion engine, a hybrid-type engine, and/or another suitable type of engine. The engine 102 generates torque by combusting an air/fuel mixture within cylinders of the engine 102. The engine 102 may include any suitable number of cylinders, such as the cylinder 112. For example only, the engine 102 may include 2, 3, 4, 5, 6, 8, 10, or 12 cylinders. Combustion of the air/fuel mixture produces exhaust.

Exhaust produced through combustion of the air/fuel mixture is expelled from the cylinders to an exhaust system 213. The exhaust system 213 includes a treatment system 214 that reduces particulate matter (PM) and nitrogen oxides (NOx) in the exhaust. The treatment system 214 includes the diesel oxidation catalyst (DOC) 116, the dosing agent injector 118, and the SCR catalyst 120.

The dosing agent injector 118 injects a dosing agent into the exhaust stream, upstream of the SCR catalyst 120. The dosing agent may be urea ($CO(NH_2)_2$), ammonia ($NH_3$), and/or another suitable dosing agent. In implementations where urea is injected, the urea reacts with the exhaust and results in $NH_3$. The dosing agent may in some instances be diluted with, for example, water ($H_2O$). In such implementations, heat from the exhaust gas evaporates the water, again resulting in $NH_3$. An exemplary chemical equation that is illustrative of the production of $NH_3$ from a dosing agent solution is provided below.

$$HCNO + H_2O \rightarrow NH_3 + CO_2$$

The SCR catalyst 120 stores (i.e., absorbs) $NH_3$ supplied by the dosing agent. The SCR catalyst 120 may be any suitable type of SCR catalyst. For example only, the SCR catalyst 120 may include a vanadium catalyst and/or a zeolite catalyst. The SCR catalyst 120 may be implemented with a diesel particulate filter (DPF) or in any other suitable configuration. An exemplary chemical equation that is illustrative of $NH_3$ absorption is provided below.

$$NH_3 + S \rightarrow NH_3(S)$$

The SCR catalyst 120 catalyzes a reaction between the stored $NH_3$ and NOx passing the SCR catalyst 120. The amount of $NH_3$ stored by the SCR catalyst 120 is referred to as current storage (mols). NOx and $NH_3$ react at a known rate, which is referred to as $k_{3OX}$. The reaction rate $k_{3OX}$ is described by the equation:

$$k_{3OX} = \frac{X \text{ mol } NH_3}{1 \text{ mol } NO_X},$$

where X varies depending on the amount of $NO_2$ in the exhaust. For example only, X varies between from 1.0 and 1.333.

The percentage of NOx that is removed from the exhaust via the NOx and $NH_3$ reaction is referred to as conversion efficiency or NOx conversion rate. The NOx conversion rate is directly related to the current storage of the SCR catalyst 120. For example only, the NOx conversion rate increases as the current storage increases.

The current storage of the SCR catalyst 120, however, is limited to a maximum amount of $NH_3$ (mols). This maximum amount of $NH_3$ is referred to as the maximum storage capacity of the SCR catalyst 120. Maintaining the current storage of the SCR catalyst 120 at the maximum storage capacity ensures that a maximum amount of NOx is removed from the exhaust. In other words, maintaining the current storage at the maximum storage capacity ensures that a maximum NOx conversion rate is achieved.

Maintaining the current storage at or near the maximum storage capacity also increases the possibility that $NH_3$ will be exhausted from the treatment system 214. This increased possibility may be attributable to the inverse relationship between the maximum storage capacity and the temperature of the SCR catalyst 120. For example, the maximum storage capacity decreases as the SCR temperature increases. A condition referred to as $NH_3$ slip occurs when $NH_3$ is exhausted from the exhaust system 213.

$NH_3$ desorbs (i.e., releases) from the SCR catalyst 120 when the SCR temperature increases at times when the current storage is equal to the maximum storage capacity. In other words, an increase in the SCR temperature causes a decrease in maximum storage capacity, and $NH_3$ stored in excess of this decreased maximum storage capacity is desorbed. Thus, an increase in the SCR temperature may cause $NH_3$ slip. An exemplary chemical equation that is illustrative of $NH_3$ desorption is provided below.

$$NH_3(S) \rightarrow NH_3 + S$$

All or a portion of $NH_3$ supplied by the dosing agent may oxidize before or after being absorbed by the SCR catalyst 120. For example, $NH_3$ may react with oxygen in the exhaust to produce nitrogen ($N_2$) and water ($H_2O$). $NH_3$ oxidation may be triggered by, for example, heat provided by the exhaust. An exemplary chemical equation that is illustrative of $NH_3$ oxidation is provided below.

$$4NH_3 + 3O_2 \rightarrow 2N_2 + 6H_2O$$

The $NH_3$ and NOx reaction produces nitrogen and water. Other components of the exhaust, such as oxygen ($O_2$), may also be involved in the $NH_3$ and NOx reaction. The exemplary chemical equations provided below are illustrative of the $NH_3$ and NOx reaction.

$$4NH_3 + 4NO + O_2 \rightarrow 4N_2 + 6H_2O$$

$$4NH_3 + 2NO + 2NO_2 \rightarrow 4N_2 + 6H_2O$$

$$8NH_3 + 6NO_2 \rightarrow 7N_2 + 12H_2O$$

The treatment system 214 includes the NOx sensors 142 and 144 and the temperature sensors 146, 148, and 150. The treatment system 214 also includes the oxygen sensor 152. The NOx sensor 142 is located upstream of the DOC 116, and the NOx sensor 144 is located downstream of the SCR catalyst 120. In other implementations, the NOx sensor 142 is located between the DOC 116 and the SCR catalyst 120.

The NOx sensors 142 and 144 measure NOx upstream and downstream of the SCR catalyst 120, respectively. In other words, the NOx sensors 142 and 144 measure NOx flowing in to and out of the SCR catalyst 120. The NOx sensors 142 and 144 generate signals corresponding to the concentration of NOx (ppm) at their respective locations, which are referred to as $NOx_{IN}$ and $NOx_{OUT}$, respectively.

The temperature sensors 146, 148, and 150 are located in various places throughout the exhaust system 213. For example only, as shown in FIG. 2, the temperature sensor 148 is located downstream of the DOC 116 and upstream of the SCR catalyst 120, and the temperature sensor 150 is located downstream of the SCR catalyst 120. The temperature sensor 146 is located upstream of the DOC 116. The temperature sensors 146, 148, and 150 each measure temperature of the exhaust at their respective locations and output a signal that corresponds to that measured temperature. The signals output by the temperature sensors 146, 148, and 150 are referred to as $T_A$, $T_B$, and $T_C$, respectively.

An engine control module (ECM) 230 controls the torque output of the engine 102. The ECM 230 includes a dosing control module 240 that controls the mass flow rate of dosing agent injected by the dosing agent injector 118. In this manner, the dosing control module 240 controls $NH_3$ supplied to the SCR catalyst 120. The mass flow rate of dosing agent supplied is referred to as $DA_{IN}$ (g/s), and the rate at which $NH_3$ is supplied to the SCR catalyst 120 is referred to as the $NH_3$ supply rate.

The dosing control module 240 according to the principles of the present disclosure controls the $DA_{IN}$ to maximize the NOx conversion rate and minimize $NH_3$ slip. The dosing control module 240 estimates the current storage of the SCR catalyst 120 based on the amount of $NH_3$ supplied to the SCR catalyst 120, $NH_3$ converted via reaction with NOx, $NH_3$ desorbed, $NH_3$ oxidized, and/or any other suitable parameters.

The dosing control module 240 also estimates the downstream concentration of NOx that will be measured by the NOx sensor 144 (i.e., $NOx_{OutPred}$). The dosing control module 240 uses this estimation of the downstream NOx with feedback from the NOx sensor 144. The NOx sensor 144, however, is cross sensitive to $NH_3$. Thus, the $NOx_{OUT}$ includes measured NOx downstream of the SCR catalyst 120 and measured $NH_3$ downstream of the SCR catalyst 120.

The dosing control module 240 adjusts the $NOx_{OutPred}$ to account for the cross sensitivity of the NOx sensor 144. Additionally, the dosing control module 240 adjusts the $NOx_{OutPred}$ to account for the characteristics of the NOx sensor 144, such as the time constant of the NOx sensor 144. The $NOx_{OutPred}$ that is adjusted for the cross sensitivity of the NOx sensor 144 and the characteristics of the NOx sensor 144 is referred to as $NOx_{OutADJ}$.

The dosing control module 240 also delays the $NOx_{OutADJ}$ based on the time necessary for the exhaust to travel through the treatment system 214 to the location of the NOx sensor 144. This period of time is referred to as the transport delay (seconds). The dosing control module 240 stores the $NOx_{OutADJ}$ and delays use of the $NOx_{OutADJ}$ until the period of time corresponding to the transport delay has passed. In this manner, the dosing control module 240 refrains from using the $NOx_{OutADJ}$ with feedback from the NOx sensor 144 until the NOx sensor 144 produces the corresponding $NOx_{OUT}$ measurement.

The dosing control module 240 determines an error term (i.e., $NOx_{ERR}$) based on the difference between the $NOx_{OutADJ}$ and $NOx_{OUT}$. The dosing control module 240 also determines possible sources of the $NOx_{ERR}$. For example only, the dosing control module 240 determines whether the $NOx_{ERR}$ is attributable to poisoning of the SCR catalyst 120, aging of the SCR catalyst 120, and/or inaccuracy in determining the current storage of the SCR catalyst 120. Other possible sources of the $NOx_{ERR}$ include, for example, inaccuracy in the adjustment of the $NOx_{OutPred}$, inaccuracy in determining $NH_3$ slip, and/or another source.

The dosing control module 240 selectively adjusts data, such as the current storage. The dosing control module 240 determines whether to adjust the current storage based on, for example, the $NOx_{ERR}$. If the dosing control module 240 determines to adjust the current storage, the dosing control module 240 determines whether the adjustment should be an increase or decrease and the magnitude of the adjustment. In this manner, the dosing control module 240 adjusts the current storage for future control of $NH_3$ supplied to the SCR catalyst 120 and/or the estimation of the NOx output.

Figure 3:
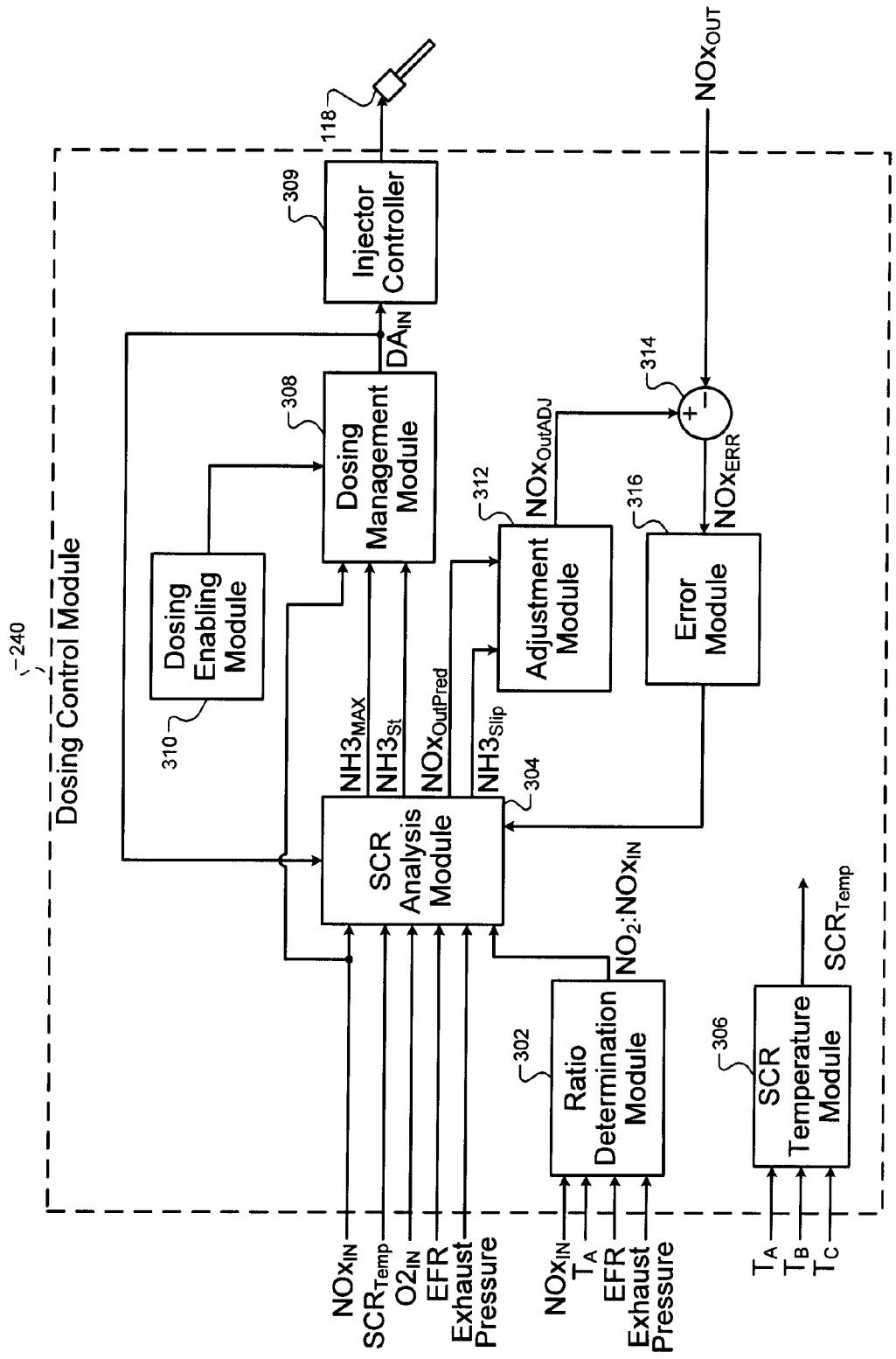
FIG. 3 is a functional block diagram of an exemplary dosing control module according to the principles of the present disclosure.

Referring now to FIG. 3, a functional block diagram of an exemplary implementation of the dosing control module 240 is presented. The dosing control module 240 includes a ratio determination module 302, an SCR analysis module 304, an SCR temperature module 306, a dosing management module 308, and a dosing enabling module 310. The dosing control module 240 also includes an adjustment module 312, a difference module 314, and an error module 316.

The ratio determination module 302 estimates the ratio of $NO_2$ in the NOx flowing into the SCR catalyst 120 and generates a $NO_2:NOx_{IN}$ signal accordingly. The ratio of $NO_2$ in the NOx flowing into the SCR catalyst 120 is referred to as the $NO_2$ ratio.

The ratio determination module 302 determines (i.e., estimates) the $NO_2$ ratio based on the exhaust conditions and the $NOx_{IN}$. The exhaust conditions include, for example, exhaust pressure, exhaust temperature, exhaust flow rate (EFR), the air/fuel mixture, and/or any other suitable parameter. The exhaust pressure may be measured, for example, upstream of the DOC 116. The exhaust temperature may be based on, for example, the $T_A$. The EFR may be measured using a sensor (not shown) and/or determined based on parameters such as the MAF into the engine 102.

The SCR analysis module 304 estimates various parameters related to control of $NH_3$ supplied to the SCR catalyst 120. For example only, the SCR analysis module 304 determines (i.e., estimates) feed-forward parameters, such as the maximum storage capacity of the SCR catalyst 120 (i.e., $NH3_{Max}$) and the current storage of the SCR catalyst 120 (i.e., $NH3_{St}$). The SCR analysis module 304 also determines (i.e., estimates) various feed-back related parameters, such as the NOx downstream of the SCR catalyst 120 (i.e., $NOx_{OutPred}$) and $NH_3$ downstream of the SCR catalyst 120 (i.e., $NH3_{Slip}$).

The SCR analysis module 304 determines the maximum storage capacity of the SCR catalyst 120 based on the SCR temperature. For example, as the SCR temperature increases, the maximum storage capacity decreases. The SCR analysis module 304 may also determine the maximum storage capacity based on other parameters, such as the EFR.

The SCR temperature module 306 determines the SCR temperature based on the temperatures $T_A$, $T_B$, and/or $T_C$. The SCR temperature may also be determined based on the configuration of the SCR catalyst 120. For example, in some implementations, the SCR catalyst 120 is divided into sections. A buffer may be included with the SCR catalyst 120, such as between the sections and/or after the SCR catalyst 120. The SCR temperature module 306 may determine a temperature for each of the sections or a temperature profile for the temperature at various locations throughout the SCR catalyst 120.

The SCR analysis module 304 also estimates the current storage of the SCR catalyst 120 and generates the $NH3_{St}$ signal accordingly. The current storage corresponds to the amount of $NH_3$ (mols) stored by the SCR catalyst 120. The SCR analysis module 304 may selectively set the current storage to a known value.

The SCR analysis module 304 thereafter determines a change in the current storage and adjusts the current storage based on the change. The SCR analysis module 304 determines the change in current storage based on $NH_3$ supplied to the SCR catalyst, $NH_3$ oxidized, $NH_3$ slip, $NH_3$ converted via reaction with NOx, and/or various other parameters. These parameters may include, for example, the SCR temperature, oxygen flowing into the SCR catalyst 120, the exhaust pressure, space velocity of the SCR catalyst 120, the EFR, and/or other suitable parameter(s).

The dosing management module 308 controls $NH_3$ supplied to the SCR catalyst 120 by controlling the mass flow rate of dosing agent injected (i.e., $DA_{IN}$)(g/s). The dosing management module 308 controls the $DA_{IN}$ based on the maximum storage capacity of the SCR catalyst 120, the current storage of the SCR catalyst 120, and the $NOx_{IN}$. The dosing management module 308 may also control the $DA_{IN}$ based on the $NO_2$ ratio. The dosing management module 308 determines a set point for the current storage that will produce a maximum NOx conversion rate and minimize the potential for $NH_3$ slip. The dosing management module 308 controls $DA_{IN}$ based on the set point.

An injector controller or driver 309, receives $DA_{IN}$ and applies a signal to the dosing agent injector 118 based on the $DA_{IN}$. The signal applied to the dosing agent injector 118 may be any suitable type of signal. For example only, a PWM signal may be applied at a duty cycle (i.e., percentage of time ON during a predetermined period of time) that corresponds to the $DA_{IN}$. By controlling the $DA_{IN}$, the dosing management module 308 controls the supply of $NH_3$ to the SCR catalyst 120.

The dosing enabling module 310 selectively enables the dosing management module 308. Otherwise, the dosing management module 308 and, therefore, $NH_3$ supplied to the SCR catalyst 120, is disabled. For example only, the dosing enabling module 310 enables the dosing management module 308 when the exhaust temperature is greater than a predetermined temperature. When the exhaust temperature is less than this temperature, injected dosing agent may be unable to convert into $NH_3$. Additionally, $NH_3$ stored by the SCR catalyst 120 may be unable to react with NOx when the exhaust temperature is less than the predetermined temperature.

The SCR analysis module 304 estimates the NOx that will be measured by the NOx sensor 144 (i.e., $NOx_{OUT}$) and generates a $NOx_{OutPred}$ signal accordingly. The SCR analysis module 304 estimates the $NOx_{OutPred}$ based on the space velocity of the SCR catalyst 120 and the SCR temperature. The $NOx_{OutPred}$ may also be estimated based on the current storage of the SCR catalyst 120, the $NO_2$ ratio, and/or other parameter(s). The $NOx_{OutPred}$, however, does not account for the cross sensitivity of the NOx sensor 144. Additionally, the $NOx_{OutPred}$ does not account for the transport delay or the characteristics of the NOx sensor 144.

The SCR analysis module 304 estimates the $NH_3$ slip that will occur when the exhaust reaches the NOx sensor 144 and generates an $NH3_{Slip}$ signal accordingly. The estimated $NH_3$ slip will be used in adjusting the $NOx_{OutPred}$ for the cross sensitivity of the NOx sensor 144. The $NH_3$ slip may include $NH_3$ desorbed from the SCR catalyst 120, $NH_3$ that traverses the SCR catalyst 120 without being absorbed, and/or other sources of $NH_3$ downstream of the SCR catalyst 120. The SCR analysis module 304 estimates the $NH_3$ slip based on the space velocity of the SCR catalyst 120, the SCR temperature, the current storage of the SCR catalyst 120, the maximum storage capacity of the SCR catalyst 120, and/or other parameter(s).

The adjustment module 312 adjusts the $NOx_{OutPred}$ for the cross sensitivity of the NOx sensor 144 and the characteristics of the NOx sensor 144. The adjusted $NOx_{OutPred}$ is referred to as $NOx_{OutADJ}$. The adjustment module 312 also delays use of the $NOx_{OutADJ}$ based on the transport delay and outputs the $NOx_{OutADJ}$ when the period of time corresponding to the transport delay has passed.

The difference module 314 receives the $NOx_{OUT}$ from the NOx sensor 144 and the $NOx_{OutADJ}$ from the adjustment module 312. The difference module 314 determines a NOx error term and generates a $NOx_{ERR}$ signal accordingly. The difference module 314 determines the NOx error term based on the difference between the $NOx_{OutADJ}$ and the $NOx_{OUT}$. For example only, the NOx error term may be determined as the $NOx_{OutADJ}$ less the $NOx_{OUT}$.

The error module 316 determines whether one or more parameters should be adjusted based on the $NOx_{ERR}$. The error module 316 may determine whether, for example, the current storage of the SCR catalyst 120 should be adjusted. For example only, the error module 316 may determine that the current storage should be adjusted when the $NOx_{ERR}$ is greater than a predetermined value.

The error module 316 determines the direction of the adjustment (e.g., increase or decrease) and the magnitude of the adjustment and adjusts the current storage accordingly. For example only, when the current storage is less than the maximum storage capacity, the $NH3_{Slip}$ is small or zero, and the $NOx_{ERR}$ is large, the error module 316 may increase the current storage. The large $NOx_{ERR}$ under these conditions may be attributable to the NOx sensor 144 measuring $NH_3$ slip. For example only, the error module 316 may adjust the current storage based on the maximum storage capacity or the $NOx_{ERR}$.

Figure 4:
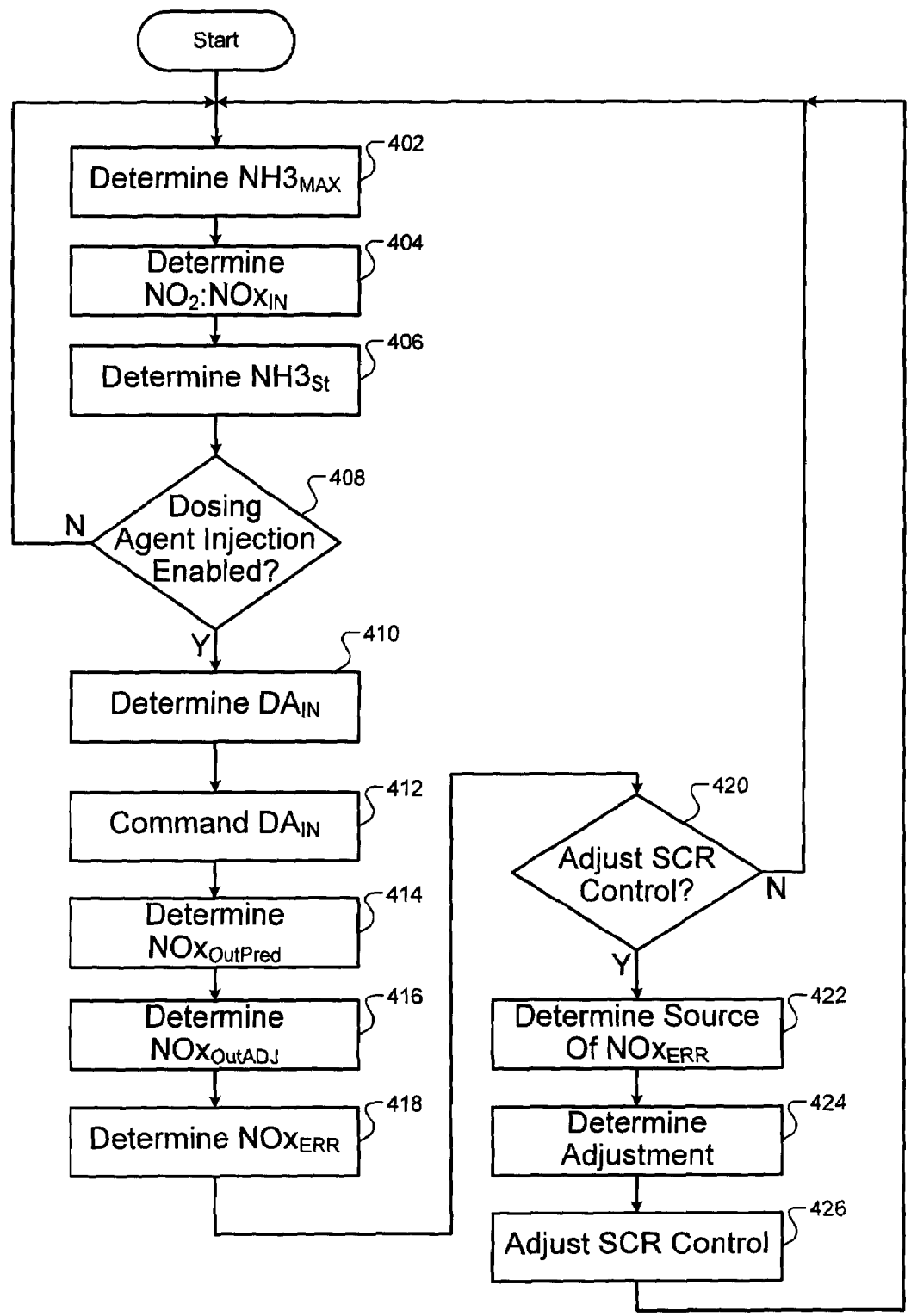
FIG. 4 is a flowchart depicting exemplary steps performed by the dosing control module according to the principles of the present disclosure.

Referring now to FIG. 4, a flowchart depicting exemplary steps performed by the dosing control module 240 is presented. The order of the steps of FIG. 4 may be changed without altering the spirit of the present disclosure.

Control begins in step 402 where control determines the maximum storage capacity of the SCR catalyst 120 (i.e., $NH3_{Max}$). Control determines the maximum storage capacity based on the SCR temperature and/or exhaust conditions. In step 404, control determines the $NO_2$ ratio (i.e., $NO_2:NOx_{IN}$). Control determines the $NO_2$ ratio based on the $NOx_{IN}$ and the exhaust conditions, such as the exhaust pressure, exhaust temperature, exhaust flow rate (EFR), the air/fuel mixture, and/or any other suitable parameter.

In step 406, control determines the current storage of the SCR catalyst 120 (i.e., $NH3_{St}$). Control determines the current storage based on $NH_3$ supplied to the SCR catalyst 120, $NH_3$ oxidized, $NH_3$ slip, and $NH_3$ converted via reaction with NOx. Control determines whether dosing agent injection is enabled in step 408. If true, control proceeds to step 410; if false, control returns to step 402. For example only, control enables the injection of dosing agent when the SCR temperature is greater than a predetermined temperature.

In step 410, control determines the mass flow rate of dosing agent to inject in step 410 (i.e., $DA_{IN}$). Control commands injection of that mass flow rate in step 412. In step 414, control estimates the NOx that will be measured by the NOx sensor 144 (i.e., $NOx_{OutPred}$). This estimated NOx, however, does not account for the characteristics of the NOx sensor 144, the cross sensitivity of the NOx sensor 144 to $NH_3$, or the transport delay.

Control determines the $NOx_{OutADJ}$ in step 416. In other words, control adjusts the $NOx_{OutPred}$ based on the cross sensitivity of the NOx sensor 144 and the characteristics of the NOx sensor 144 in step 416. Control also delays use of the $NOx_{OutADJ}$ until the transport delay has passed. Control determines the NOx error term (i.e., $NOx_{ERR}$) in step 418. Control determines the NOx error term based on the difference between the $NOx_{OUT}$ provided by the NOx sensor 144 and the $NOx_{OutADJ}$.

In step 420, control determines whether to adjust control of the SCR catalyst 120. For example only, control determines whether to adjust the current storage in step 420. If true, control proceeds to step 422; if false, control returns to step 402. Control may determine whether to adjust control of the SCR catalyst 120 based on, for example, the $NOx_{ERR}$.

Control determines the source of the $NOx_{ERR}$ in step 422. For example only, the source of the $NOx_{ERR}$ may include aging of the SCR catalyst 120, poisoning of the SCR catalyst 120, and/or inaccuracy in the determination of one of the above mentioned parameters. In step 424, control determines how to adjust the control of the SCR catalyst 120. For example, control determines the magnitude and direction of the adjustment of the current storage. Control makes the adjustments in step 426 and control returns to step 402.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:
1. A dosing control system comprising:
a selective catalytic reduction (SCR) analysis module that estimates ammonia (NH3) stored by an SCR catalyst, maximum NH3 storage capacity of said SCR catalyst, NH3 slip downstream of said SCR catalyst, NH3 oxidation, and NH3 conversion through reaction with nitrogen oxides (NOx), wherein said NH3 stored is estimated based an amount of dosing agent injected, said NH3 slip, said NH3 oxidation, and said NH3 conversion; and a dosing management module that controls dosing agent injection into an exhaust system upstream of said SCR catalyst based on said NH3 stored by said SCR catalyst and said maximum NH3 storage capacity.

2. The dosing control system of claim 1 further comprising an error module that determines a difference between NOx measured by a NOx sensor downstream of said SCR catalyst and an estimated NOx measurement for said NOx sensor and that selectively adjusts at least one of said maximum NH3 storage capacity and said NH3 stored based on said difference.

3. The dosing control system of claim 2 wherein said SCR analysis module estimates said estimated NOx measurement.

4. The dosing control system of claim 2 further comprising an adjustment module that outputs an adjusted estimate of said estimated NOx measurement based on said estimated NOx measurement and said NH3 slip,
wherein said error module determines said difference between said NOx measured by said NOx sensor and said adjusted estimate.

5. The dosing control system of claim 4 wherein said adjustment module delays said output of said adjusted estimate for a delay period for said NOx sensor.

6. The dosing control system of claim 2 wherein said error module selectively increases said NH3 stored by said SCR catalyst when said difference is greater than a first predetermined amount while said NH3 stored is less than said maximum NH3 storage capacity and said NH3 slip is less than a second predetermined amount.

7. The dosing control system of claim 1 wherein said SCR analysis module estimates NH3 desorption and adjusts said NH3 slip based on said NH3 desorption.

8. The dosing control system of claim 1 wherein said dosing management module determines an NH3 setpoint based on said maximum NH3 storage capacity and said NH3 stored and controls said dosing agent injection based on said NH3 setpoint.

9. The dosing control system of claim 1 wherein said SCR analysis module estimates said NH3 stored further based on NOx measured upstream of said SCR catalyst and nitrogen dioxide (NO2) in said NOx measured upstream of said SCR catalyst.

10. A dosing control method comprising:
estimating a maximum ammonia (NH3) storage capacity of a selective catalytic reduction (SCR) catalyst;
estimating NH3 slip downstream of said SCR catalyst;
estimating NH3 oxidation;
estimating NH3 conversion through reaction with nitrogen oxides (NOx);
estimating NH3 stored by said SCR catalyst based an amount of dosing agent injected, said NH3 slip, said NH3 oxidation, and said NH3 conversion; and
controlling dosing agent injection into an exhaust system upstream of said SCR catalyst based on said NH3 stored by said SCR catalyst and said maximum NH3 storage capacity.

11. The dosing control method of claim 10 further comprising:
determining a difference between NOx measured by a NOx sensor downstream of said SCR catalyst and an estimated NOx measurement for said NOx sensor; and
selectively adjusting at least one of said maximum NH3 storage capacity and said NH3 stored based on said difference.

12. The dosing control method of claim 11 further comprising estimating said estimated NOx measurement.

13. The dosing control method of claim 11 further comprising outputting an adjusted estimate of said estimated NOx measurement based on said estimated NOx measurement and said NH3 slip,
wherein determining said difference comprises determining said difference between said NOx measured by said NOx sensor and said adjusted estimate.

14. The dosing control method of claim 13 further comprising delaying said outputting of said adjusted estimate for a delay period for said NOx sensor.

15. The dosing control method of claim 11 wherein said selectively adjusting comprises selectively increasing said NH3 stored by said SCR catalyst when said difference is greater than a first predetermined amount while said NH3 stored is less than said maximum NH3 storage capacity and said NH3 slip is less than a second predetermined amount.

16. The dosing control method of claim 10 further comprising:
estimating NH3 desorption; and
adjusting said NH3 slip based on said NH3 desorption.

17. The dosing control method of claim 10 further comprising:
determining an NH3 setpoint based on said maximum NH3 storage capacity and said NH3 stored; and
controlling said dosing agent injection based on said NH3 setpoint.

18. The dosing control method of claim 1 wherein said estimating said stored comprises estimating said NH3 stored further based on NOx measured upstream of said SCR catalyst and nitrogen dioxide (NO2) in said NOx measured upstream of said SCR catalyst.

* * * * *